United States Patent [19]
Fugate et al.

[11] Patent Number: 5,176,728
[45] Date of Patent: Jan. 5, 1993

[54] METHOD OF MAKING A MIRROR HAVING EXTREMELY SMALL APERTURE HOLES AT OTHER THAN NORMAL ANGLES TO THE SURFACES OF THE MIRROR

[75] Inventors: Thomas V. Fugate; Tod L. Erickson, both of San Jose, Calif.

[73] Assignee: Cambrian Systems, Inc., Fremont, Calif.

[21] Appl. No.: 764,532

[22] Filed: Sep. 24, 1991

[51] Int. Cl.⁵ .......................................... C03B 23/207
[52] U.S. Cl. .......................................... 65/4.3; 65/3.15; 65/31; 65/2; 65/60.4
[58] Field of Search .................. 65/4.1, 4.21, 4.3, 3.15, 65/2, 31, 60.4

[56] References Cited

U.S. PATENT DOCUMENTS

| | | | |
|---|---|---|---|
| 2,030,476 | 1/1931 | Smith | 65/60.4 X |
| 3,241,934 | 3/1966 | Granitsas et al. | 65/3.15 |
| 3,265,480 | 8/1966 | Hicks | 65/4.21 |
| 3,771,983 | 11/1973 | Straka | 65/31 |
| 4,011,007 | 3/1977 | Phaneuf et al. | 65/4.2 X |
| 4,106,859 | 8/1978 | Doriguzzi et al. | 65/60.4 X |
| 4,554,460 | 11/1985 | Klein | 250/578 |
| 4,593,368 | 6/1986 | Fridge et al. | 364/525 |
| 4,853,020 | 8/1989 | Sink | 65/4.1 |

OTHER PUBLICATIONS

Photo Research Product Bulletin No. 695, Copyright 1990.

Primary Examiner—Robert L. Lindsay
Attorney, Agent, or Firm—Thomas E. Schatzel

[57] ABSTRACT

A process for manufacturing mirrors comprising notching the backside of a plate and etching it from one or both sides. The front side is plated and polished to a flat mirror-like-like surface. The plate is made from glass rods that have been fused together in a bundle and then heated and stretched. One of the glass rods, near the center, is being susceptible to etching while the others are not. Therefore, when the glass rod bundle is drawn out, they will neck-down and become very fine. When the center glass rod has been drawn down to, for example, about five mils in diameter, the neck of the bundle is harvested for the above plates, by slicing out wafers at an angle, e.g., 45°. The etchants will attack the center glass rod, but not those that surround it, due to their chemical properties. The result is a very sharply formed aperture hole of any desired diameter.

6 Claims, 2 Drawing Sheets

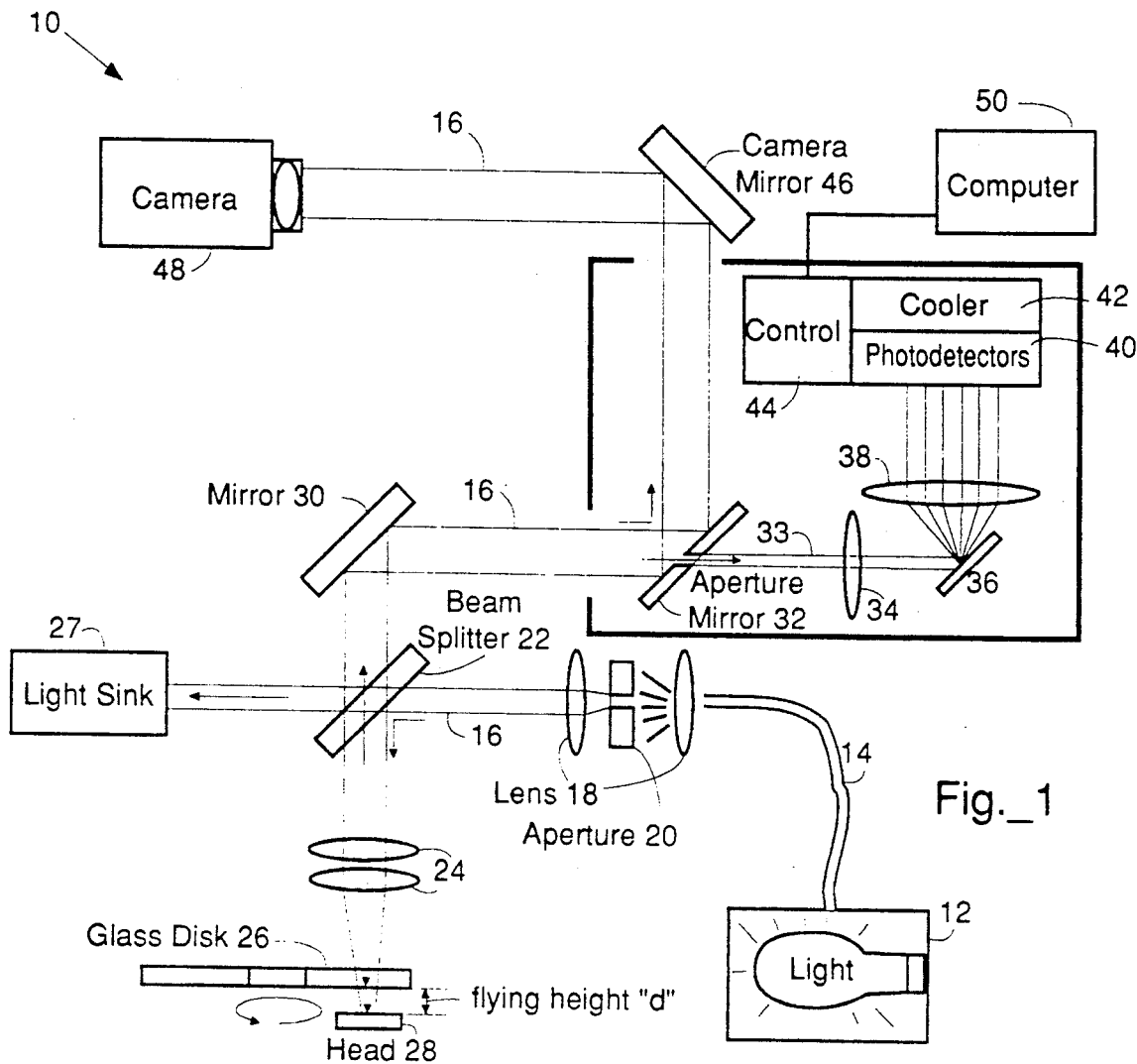
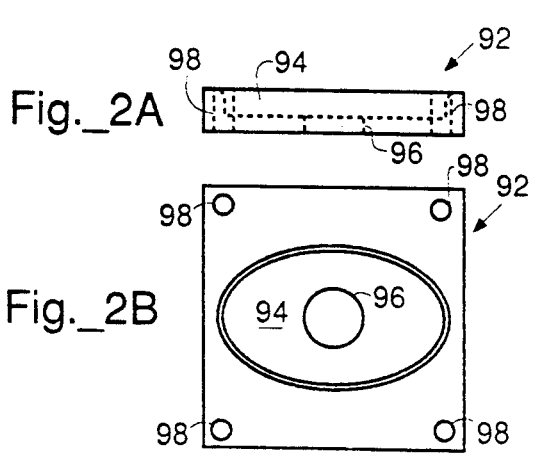
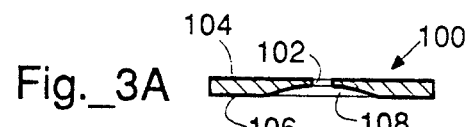
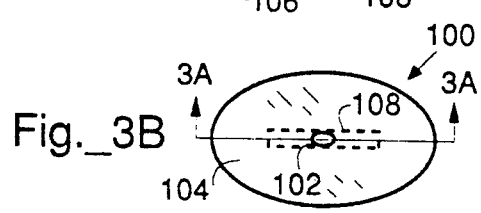
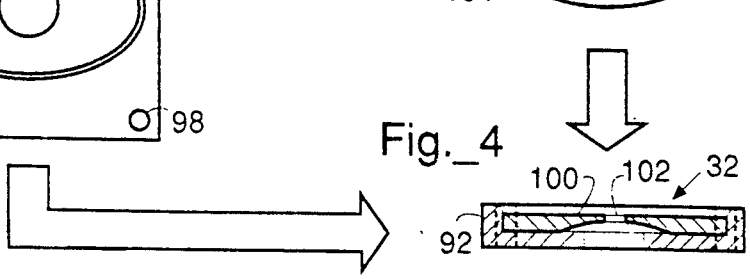

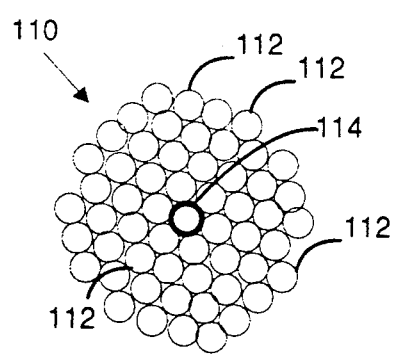
Fig._5A
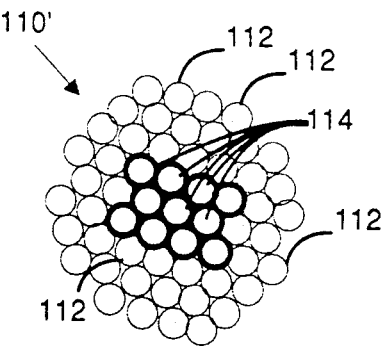
Fig._5B
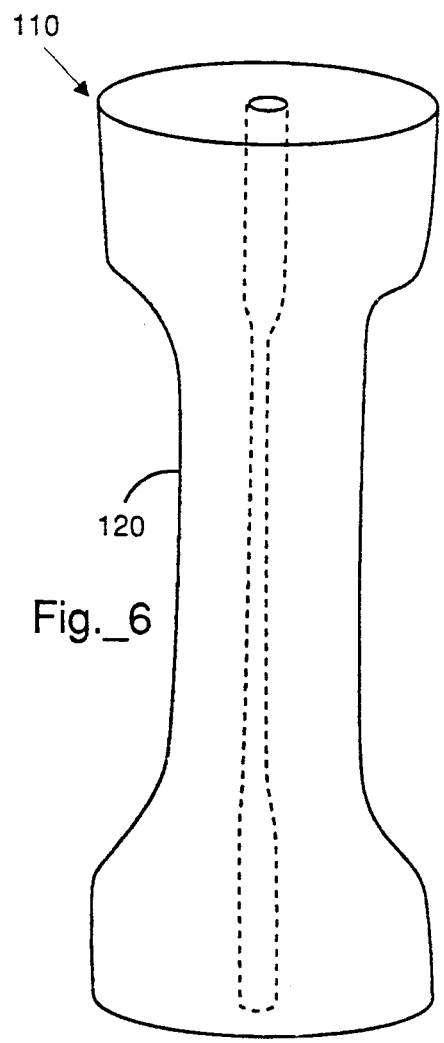
Fig._6
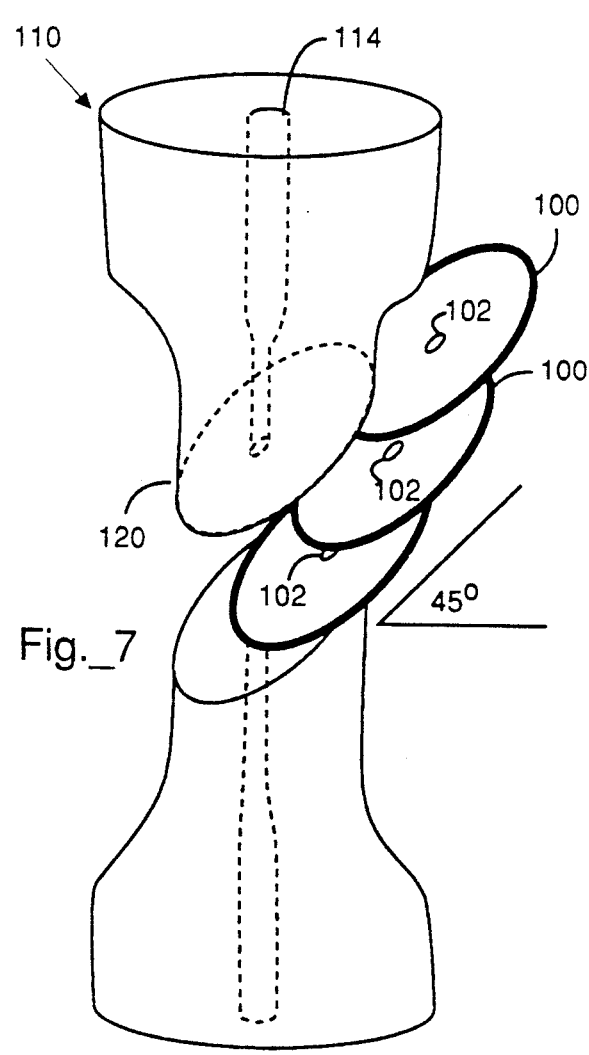
Fig._7

METHOD OF MAKING A MIRROR HAVING EXTREMELY SMALL APERTURE HOLES AT OTHER THAN NORMAL ANGLES TO THE SURFACES OF THE MIRROR

BACKGROUND OF THE INVENTION

1. Field of the Invention

The present invention relates generally to mirrors with aperture holes, and more particularly to methods of fabricating the mirrors with extremely small aperture holes that are sharp and cleanly defined.

2. Description of the Prior Art

The heads in many high density disk drives actually fly above the magnetic surface of the disk media. The "flying height" is a critical parameter and must be carefully and accurately measured to assure optimum performance.

Photo Research ®, a division of Kollmorgen (Chatsworth, CA), has made commercially available a family of fast scanning PC-controlled spectroradiometers (e.g., model PR-704/714) that are useful in magnetic head flying height measurements. An incoming source of light passes through an entrance slit and falls on a wavelength disperser, or diffraction grating. (See, Photo Research product bulletin no. 695, copyright 1990.) A multi-element photodetector is placed in the focal plane of the diffracted spectrum. Each narrow band wavelength is sensed by a separate photo element. Thus the entire spectrum is electronically scanned. The Photo Research system is described as being compatible with the AT-bus for the IBM personal computer and has software that loads on the PC. A feature that is included is labeled Automatic Adaptive Sensitivity. (See, U.S. Pat. No. 4,554,460.)

A technique for measuring the very small spaces such as between a glass disk and magnetic head or slider, is described in U.S. Pat. No. 4,593,368, issued Jun. 3, 1986, to Fridge, et al. A broad spectrum light is reflected off of two non-contacting surfaces and the reflected light combines constructively and destructively such that the amplitude varies with wavelength. The combined signals are analyzed at "a large number of wavelengths", and the wavelength or wavelengths of maximum intensity and/or minimum intensity are identified. Typically, the light intensity minima is said by Fridge, et al., to occur at $d = (\frac{1}{2})nL$ and maxima at $d = (\frac{1}{2})(n - \frac{1}{2})$, where d is the separation, L is the wavelength, and n is a positive integer indicating the order. The actual plot of intensity versus wavelength is correlated with the theoretical intensity versus wavelength function, and this correlation of curve fitting is carried forward to calculate the spacing "d" to any desired accuracy within the limits of the input data. Fridge, et al., lists one useful relationship as being:

$$d = \frac{1}{4(1/L_1 - 1/L_2)};$$

where $L_1$ and $L_2$ are maximum and minimum intensity wavelengths, respectively.

Prior art methods of manufacturing mirrors with small aperture holes (about five mils) have proved difficult to maintain in production volumes and low yields from the limited number of manufacturers in the world has been a critical path element in spectroradiometer production for those units requiring small apertures. Etching methods that have been used result in holes that are non-cylindrical and lack good sharp corners. A black, non-reflecting irregular zone on the mirror surface forms around the aperture hole and appears to a camera focussed on the reflection to be the aperture hole, when, in fact, the actual aperture hole is smaller and located somewhere within the zone. These prior art processes also tend to produce related black spots, or even holes, all over the front side mirror surface. As the state of the art progresses in spectroradiometric applications, the sizes of the required aperture holes decreases, and the previously acceptable surface defects can become easily confused with the intended aperture hole during measurements.

SUMMARY OF THE INVENTION

It is therefore the object of the present invention to provide a process of producing high quality Prichard mirrors with high quality aperture holes.

Briefly, a preferred embodiment of the present invention is a manufacturing process that comprises notching the backside of a plate and etching it from one or both sides. The front side is then plated and polished to a flat mirror-like surface. The plate is made of glass rods that have been fused together in a bundle and then heated and stretched. One of the glass rods, near the center, is susceptible to etching while the others are not. Therefore, when the glass rod bundle is drawn out, they will neck-down and become very fine. When the center glass rod has been drawn down to about five mils in diameter, the neck of the bundle is harvested for the above plates, by slicing out wafers at an angle, e.g., 45°. The angle being determined by the requirements of particular applications. The etchants will attack the center glass rod, but not those that surround it, due to their chemical properties. The result is a very sharply formed aperture hole.

An advantage of the present invention is that small aperture holes can be formed with exacting quality and precision not known to previous manufactures.

Another advantage of the present invention is that the cost of manufacturing such mirrors is reduced.

Another advantage of the present invention is that manufacturing yields are very high.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a block diagram of a spectroradiometric measurement system according to a first embodiment of the present invention;

FIG. 2A is a side view and FIG. 2B is a top view of the aperture housing used in the aperture mirror in the system of FIG. 1;

FIG. 3A is a cross-sectional view and FIG. 3B is a top view of the mirror plate used in the aperture mirror in the system of FIG. 1. The cross section of FIG. 3A is taken along the line 3A–3A in FIG. 3B;

FIG. 4 shows the aperture housing of FIG. 2A–2B and mirror plate of FIGS. 3A-3B assembled into the aperture mirror of FIG. 1;

FIG. 5A is an end view of bundled glass rods used in the manufacturing process of a mirror plate with a small round aperture hole;

FIG. 5B is an end view of bundled glass rods, similar to that of FIG. 5A, but used in the manufacturing of a mirror plate with a rectangularly shaped aperture hole;

FIG. 6 is a perspective view of the bundle of glass rods after their having been heated, fused, and drawn. The center glass rod has been highlighted for clarity; and FIG. 7 shows several wafers being harvested from the neck of the glass rod bundle of FIG. 6.

DETAILED DESCRIPTION OF THE PREFERRED EMBODIMENTS

FIG. 1 illustrates a system 10, according to a first embodiment of the present invention, comprising a light 12 with a fiber optics cable 14 that emits a light beam 16 through a pair of lenses 18 and an aperture 20. Part of light beam 16 reflects off of a beam splitter 22 and passes through a set of objective lenses 24 and through a glass disk 26. The other part of light beam 16 passes through beam splitter 22 and is absorbed by light sink 27. Glass disk 26 replaces the usual opaque disk made of metal, which is covered by a magnetic coating, so that light bounced between disk 26 and a flying read/write magnetic head 28 can be sampled and analyzed by system 10. Disk 26 is spun and an air cushion of thickness "d" builds between disk 26 and head 28 according to the aerodynamics of head 28 and control arm pressure applied. (This type of head is well known in the art, and is used in so-called "Winchester" type disk drives.)

Light beam 16 reflects off of both head 28 and the surface of disk 26 such that the two reflections interfere with one another. This inference adds and subtracts light amplitude at various wavelengths according to the separation distance between disk 26 and head 28, which is the flying height "d". (This physical phenomenon is well known and will not be described further.) The reflected light then passes, in part, through beam splitter 22 and reflects off of an mirror 30. An aperture mirror 32, having an exceedingly small hole, reflects most of the light but passes a small beam 33 through a lens 34. Mirror 32 is also known as a Prichard mirror, the manufacture of which is described in detail below.

A diffraction grating 36 splits the beam 33 such that the different wavelengths of beam 33 are reflected at different angles (much like a prism) through a lens 38. An array of photodetectors 40 senses the amplitude of beam 33 at discrete wavelengths by virtue of their physical placements along the spread of light split by diffraction grating 36. A thermoelectric cooler 42 cools photodetectors 40 to improve their light sensitivity. A control block 44 reads photodetectors 40.

The majority of the light that reflects off of aperture mirror 32 travels on to be reflected by mirror 46 and is imaged by camera 48. The image produced by camera 48 is that of head 28. A hole in the image received by camera 48 corresponds to the aperture hole in mirror 32. Camera 48 will interpret this as a small black dot. The entire assembly is moved to place the black dot at various positions of interest around the bottom of head 28. The actual portion of light beam 16 that corresponds to this black dot and passes as beam 33 can therefore be adjusted by an operator keeping an eye on the camera image. Thus, separation measurements (e.g., "d") can be taken at any number of points, such as along the slider rails, on head 28. A computer 50 receives the output of photodetectors 40 via control 44. Computer 50 can be a microprocessor system such as an IBM personal computer model AT ("PC/AT"), or equivalent (so-called "PC clone").

In FIG. 2A-2B, an aperture housing 92 has a well 94, a port 96, and four mounting holes 98. In FIG. 3A-3B, a plate 100 has an aperture hole 102, a polished front side surface 104, a backside surface 106, and a grinding relief 108. Aperture hole 102 is designed to allow light beam 33 (FIG. 1) to pass through it and on to lens 34. The grinding relief 108 reduces the thickness of plate 100 at aperture hole 102 from about twenty mils to about two to four mils. Plate 100 and aperture hole 102 are elongated ellipses such that they both appear to be round circles when the mirror 32 is tilted 45° with respect to the axis of light beam 16 (FIG. 1). In FIG. 4, plate 100 is mounted within aperture housing 92 for structural support.

Starting with FIG. 5A, plate 100 is manufactured by assembling a bundle 110 of non-etchant susceptible glass rods 112 around a single etchant susceptible glass rod 114. Bundle 110 is heated to fuse rods 112 and 114 together.

An alternatively shaped rectangular aperture hole can be made by arranging several rods 114 as shown in FIG. 5B. A bundle 110' is marked in FIG. 5B by prime notation to signify its close similarity to bundle 110 in FIG. 5A. The difference is in the number of rods 114. Of course, apertures of just about any size and shape can be realized by arranging enough rods 114 in a corresponding geometry. The remaining discussion below that refers to bundle 110 can apply just as well to bundle 110'.

In FIG. 6, bundle 110 is shown being drawn out into a neck 120. The diameter of rod 114 at neck 120 is reduced by the drawing out of bundle 110. By using multiple drawings out, a very precisely determined diameter of rod 114 at neck 120 can be obtained. Later in the manufacturing process, this diameter will correspond exactly to the diameter of aperture hole 102.

In FIG. 7, several wafers of plate 100 are being sawed out of bundle 110 at about a 45° angle relative to the horizontal. Relief 108 is ground into backside surface 106 of each plate 100 and then the remnants of rod 114 are etched away from one or both sides, leaving aperture hole 102. Plate 100 is polished flat to mirror-like quality after having chrome, nickel, or other suitably reflective material deposited by sputtering.

When titled at a 45° angle in an appropriate direction, plate 100 will present the length of aperture hole 102 perfectly parallel to light beam 16. If the aperture hole had been cut perpendicular to front side surface 104, the length of aperture hole would be at a 45° angle to light beam 16 with the result that beam 33 would be trimmed at both the top and bottom into an ellipsoidal cross-section.

Nevertheless, some light will strike the inside surfaces of aperture hole 102 and dilute the sample received by photodetectors 40 by bending and reflecting light within what had originally been the glass in rods 112. Therefore, in an alternative embodiment, glass rods 112 are comprised of black or otherwise opaque glass, so that light will not be transmitted within plate 100. Although the benefits of the use of opaque glass can be realized by making only a minimum collar of opaque glass rods 112 to surround rod 114, it can be easier and/or more efficient to manufacture plate 100 by all rods 112 being comprised of opaque glass.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method of manufacturing mirrors for sampling of a light at an incident angle not normal to the surface of each mirror to pass through at least one aperture hole that passes through each mirror at an angle "A" relative to a normal to the surface of each mirror wherein the inside walls of the aperture do not substantially interfere with incident light passing through the aperture hole at angle "A", the method comprising the steps of:

bundling a plurality of glass rods of a first-type glass around a round rod of a second-type glass, said first-type glass not being susceptible and said second type being susceptible to a chemical etch;

fusing said bundle of glass rods;

drawing said bundle of glass rods such that a diameter of said second-type glass rods becomes substantially smaller;

cutting a wafer from said fused and drawn bundle of glass rods at an angle that is a complement of angle "A";

etching away from said wafer said second-type glass with said chemical etch to produce an aperture hole in said wafer such that said aperture hole passes through said wafer at an angle "A" relative to a normal to the surface of each mirror wherein the inside walls of the aperture do not substantially interfere with incident light passing through the aperture hole at angle "A"; and depositing on at least one surface of said wafer a reflective material such that a mirror is formed thereby.

2. The method of claim 1, wherein:
the bundling is such that said first-type glass rods comprise opaque glass.

3. The method of claim 1, wherein:
the cutting of a wafer is at approximately 45° to the drawn bundle.

4. A method of manufacturing mirrors with at least one aperture hole, the method comprising the steps of:

bundling a plurality of first-type glass rods around a single rod of a second-type glass, said first-type not being susceptible and said second-type being susceptible to a chemical etch;

fusing said bundle of glass rods;

drawing said bundle of glass rods such that a diameter of said second-type glass rod becomes substantially smaller;

cutting a wafer from said fused and drawn bundle of glass rods at an angle;

etching away said second type glass rod with said chemical etch to produce an aperture hole in said wafer;

grinding one side of said wafer to reduce the thickness of said wafer at the site of said aperture hole, the grinding preceding the etching;

plating said wafer with a reflective material; and polishing said wafer to obtain a mirror-like surface on at least one side of said wafer.

5. The method of claim 4, further comprising the steps of:

mounting said wafer in a support bracket such that said wafer is mechanically strengthened and attachment points are provided to mount the wafer and bracket assembly.

6. A method of manufacturing a mirror for sampling a portion of an incident light received at an angle not normal to the surface of each mirror to pass through a rectangularly-shaped aperture hole through the mirror at an angle "A" relative to a normal to the surface of the mirror wherein the inside walls of the aperture do not substantially reduce the incident light passing through the aperture hole at angle "A", the method comprising the steps of:

bundling a plurality of rods of a first-type glass around a rectangularly-shaped bundle of rods of a second-type glass, said first-type glass being less susceptible to a chemical etch than said second-type glass;

fusing said bundle of first and second type glass rods;

drawing said bundle of first and second type glass rods such that a diameter of said second-type glass rod becomes substantially smaller;

cutting a wafer from said fused and drawn bundle of first and second type glass rods at an angle that is a complement of angle "A";

etching away from said wafer said second-type glass with said chemical etch to produce a rectangularly-shaped aperture hole that passes through said wafer at an angle "A" relative to a normal to the surface of each mirror wherein the inside walls of the rectangularly-shaped aperture do not substantially interfere with incident light passing through the aperture hole at angle "A"; and depositing on at least one surface of said wafer a reflective material such that a mirror is formed thereby.

* * * * *